H. J. MORTENSEN.
DEMOUNTABLE WHEEL RIM.
APPLICATION FILED NOV. 8, 1909.

957,080.

Patented May 3, 1910.
2 SHEETS—SHEET 1.

Witnesses
F. E. Maynard
R. S. Berry

Inventor,
Harry J. Mortensen,
By Geo. H. Strong
his Atty

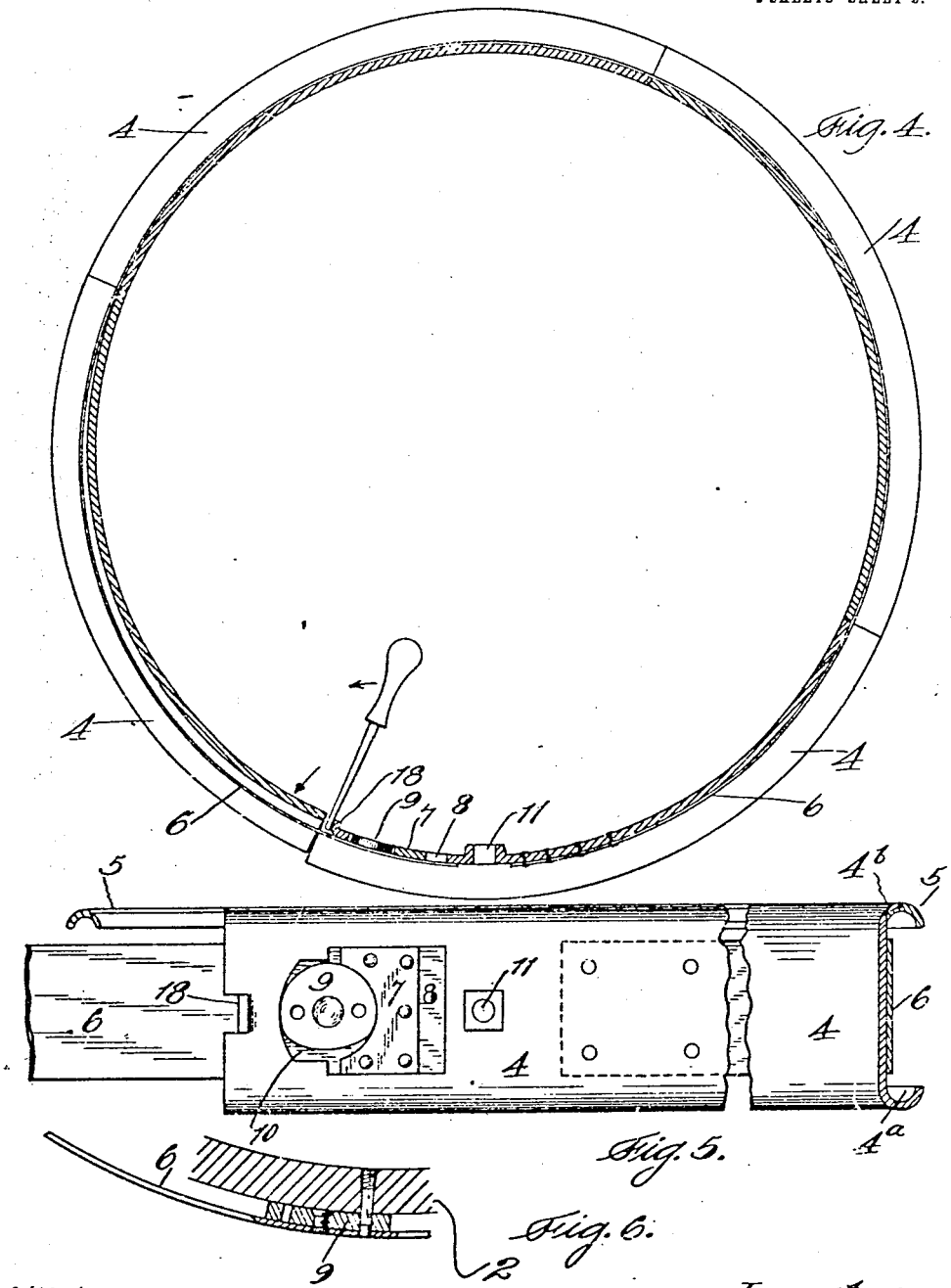

UNITED STATES PATENT OFFICE.

HARRY J. MORTENSEN, OF OAKLAND, CALIFORNIA.

DEMOUNTABLE WHEEL-RIM.

957,080.

Specification of Letters Patent.

Patented May 3, 1910.

Application filed November 8, 1909. Serial No. 526,743.

*To all whom it may concern:*

Be it known that I, HARRY J. MORTENSEN, a citizen of the United States, residing at Oakland, in the county of Alameda and State of California, have invented new and useful Improvements in Demountable Wheel-Rims, of which the following is a specification.

My invention relates to improvements in wheel rims, and is particularly applicable to rims which are designed to carry an inflated pneumatic tire ready for use; and it consists in a novel means for rapidly engaging or disengaging the complete structure to or from the wheel proper.

The invention consists in a combination of parts, and in details of construction which will be more fully explained by reference to the accompanying drawings, in which—

Figure 1:
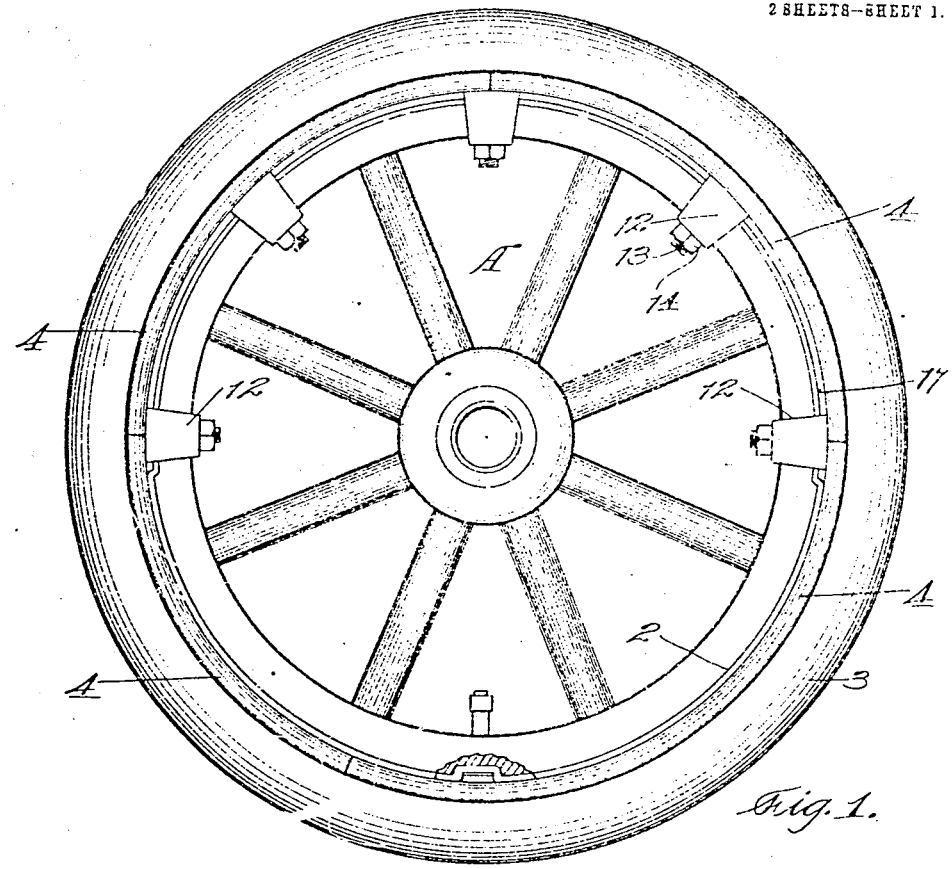
Figure 2:
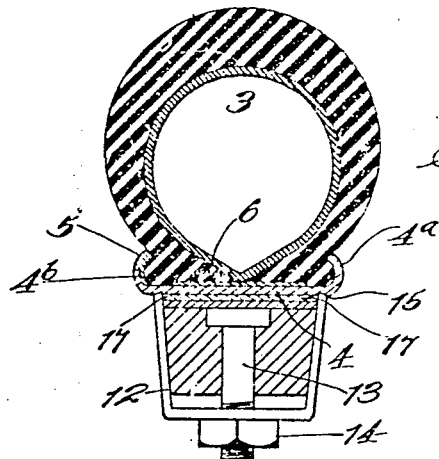
Figure 3:
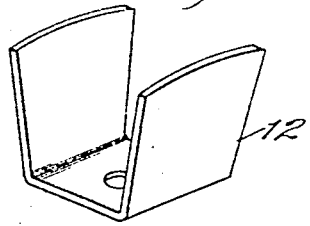

Figure 1 is a view of the assembled wheel and rim. Fig. 2 is a transverse section. Fig. 3 is a perspective view of one of the holding clamps. Fig. 4 is a side sectional view of the demountable rim sections, band, and lock. Fig. 5 is a plan view of the same. Fig. 6 is a sectional detail of the lock.

In the construction of wheels adapted to carry pneumatic or other removable tires, it has been found desirable, especially for the latter class of tires, to mount the fully-inflated tires upon a rim which is provided with means by which it can be rapidly attached to and detached from the wheel, and various devices have been employed for this purpose.

In my invention, the wheel A may be of any well known or suitable description having a substantially cylindrical encircling rim 2. This tire or band is adapted to receive the rim which carries the pneumatic tire 3. This rim is made in a sufficient number of sections 4 to form a complete annulus which is fitted upon the periphery 2 of the wheel. These sections are made with an inwardly curved flange 4ª upon one edge, and this flange serves to receive and retain one of the interlocking ribs or beads of the pneumatic tire 3. The opposite edges of these sections are turned up sufficiently to keep the tire-engaging ring 5 in position, but not enough to prevent the sections 4 being easily disengaged and removed toward the inside. The ring 5 has its outer edge curved over sufficiently to engage and hold one rib of the tire, while the other tire rib is retained by the flanges 4ª of the sections 4. If both flanges were formed rigidly upon the rim sections 4, and curved inwardly, it would be difficult to assemble or separate the parts on account of the stiffness of the tire fabric, but in this construction, it will be seen that one edge of the rim sections when disengaged, may be drawn inwardly, away from the ring 5, pivoting or turning as it were about the incurved portion 4ª, see Fig. 2. In order to retain these sections 4 in relative position, and to lock them in place so that this rim and the inflated tire would be in readiness to apply to the wheel, I employ a band 6 which is preferably made of steel, and of such size that when the rim sections are in position to form a complete annulus, this band fits in the bottom of the channel in which the tire is seated, and by suitable means the structure is given the tension which makes it rigid and complete, and in readiness to be applied to the wheel without any disturbance of its own elements. The band is preferably fixed permanently to one of the sections; the other sections being loose within it. These sections are placed in position, with their ends abutting, until the whole interior of the band has been filled with the sections.

As there must be an allowance made for the sections to be placed, I have shown a slide 7 fitted into a channel 8 which is made near the end of one of the meeting sections. The slide is fixed to and movable with the end of the band, opposite to the one which is fixed to the section as previously described.

9 is an eccentric or cam turnable in a space 10 which is formed between the slide 7 and the contiguous end of the channel 8. It will be seen that by turning this eccentric in one direction, the slide will be allowed to move in the channel so as to release the constriction of the band upon the sections 4, and thus allow them to be readily removed.

The rim and tire may be assembled as follows: The section 4, to which the band 6 is fixed, is conveniently placed, the tire valve stem inserted into the hole 11, and one edge of the tire rib is pressed into place within the turned-over flange 4ª of that section. The ring 5 is next placed to engage with the opposite tire rib. The succeeding sections 4 are then placed by hooking their turned over flanges over the tire rib, and as the flanges 4ᵇ are shallow, they may be pressed against the ring 5. The last section may be sprung into place by the use of a screw-driver, or other suitable tool, and the band 6 thus tightened to hold all parts firmly together after which the tire may be inflated in readiness for use. The ends of the sections may be formed in any plane, or in any suitable manner to insure their abutting so as to form a smooth and continuous annulus when in position. In order to secure this demountable structure to the felly of the wheel, I have shown a series of clamps 12, the sides of which fit snugly against the sides of the felly of the wheel, and the uniting portion extends across within the felly, as plainly shown in Figs. 1 and
2. Holes are made centrally through this portion of the clamps and bolts 13 which are fixed in the wheel felly, project through these holes and have screw-threaded outer ends adapted to receive nuts 14. When these nuts are partly unscrewed, the clamps may be drawn inwardly so as to allow the demountable rim to be slipped into place on the exterior rim 2 of the wheel; then by turning the nuts, the clamps are forced outwardly so as to engage with the rim sections. These clamps have their edges beveled or otherwise suitably formed so as to engage with corresponding grooves or notches in the rim sections 4, as plainly shown at 15, Fig. 2. When all of these nuts have been screwed up, and the parts fully engaged, the wheel, with its rim and tire, will be practically a solid unitary structure, capable of withstanding the hardest usage.
If by accident, or for other reason, it is necessary to remove or replace a tire, it is only necessary to loosen the nuts and retract the clamps, when a new rim and tire already prepared, may be inserted to replace the injured one; the work being very rapidly completed. The separation and removing of the rim sections, tire and parts, which go to make up the rim, may be effected at any time in the manner previously described. A filling segment may be inserted, as shown at 17, to close the space which is necessary in applying or removing a rim.

In order to insure the easy assembling of the segments it may be necessary to use a tool having an edge, such as a screw-driver. I have therefore shown a lug 18 projecting from the section contiguous to the lock, and this lug serves as a fulcrum between which and the opposed edge, the tool may act to insure the assembling of the parts.

It will be understood that any equivalent or suitable locking device may be substituted for the eccentric without changing the character of my invention.

Having thus described my invention, what I claim and desire to secure by Letters Patent is—

1. The combination with a wheel, of a rim formed of sections, a band surrounding said sections having one end secured to one of the sections, and means engaging the other end of the band for constricting the band and holding the sections in interlocked position.

2. The combination with a wheel, of a rim formed of a series of removably secured sections, a band circumscribing the rim having one end secured to one of said sections and having the opposite end free, and means engaging the free end of the band for moving the same and thereby constricting said band about the sections and holding the latter in interlocked position.

3. A demountable rim consisting of sections forming an annulus and having flanges at the sides, an inclosing band having one end fixed and the other movable whereby the band is constricted about the sections, means carried by one of the sections and engaging the free end of the band for constricting and expanding the band.

4. The combination with a wheel, of a rim formed of segments, the meeting ends of which are adapted to engage to form a continuous annulus, a band surrounding said rim sections having one end fixed to one of the sections, a slide with which the opposite end is connected, and means to move said slide to cause the band to compress and hold the sections.

5. A demountable rim consisting of segmental sections having a tire-engaging flange on one edge, and a continuous surrounding, movable, opposing tire-engaging flange, an inclosing flat band having one end fixed to one of the sections, a movable slide to which the other end is attached, and means to constrict and lock the band about the sections.

6. A demountable rim consisting of flanged segmental sections engageable to form an annulus, an inclosing band having one end fixed to one of the sections, means to constrict the band about the sections, and a lug against which a tool may act to engage the final section.

In testimony whereof I have hereunto set my hand in the presence of two subscribing witnesses.

HARRY J. MORTENSEN.

Witnesses:
GEO. H. STRONG,
RAYMOND A. LEONARD.